Oct. 31, 1967   E. V. BECKMAN ET AL   3,350,144
EXPANSION MOUNTING
Filed Sept. 2, 1965   2 Sheets-Sheet 2
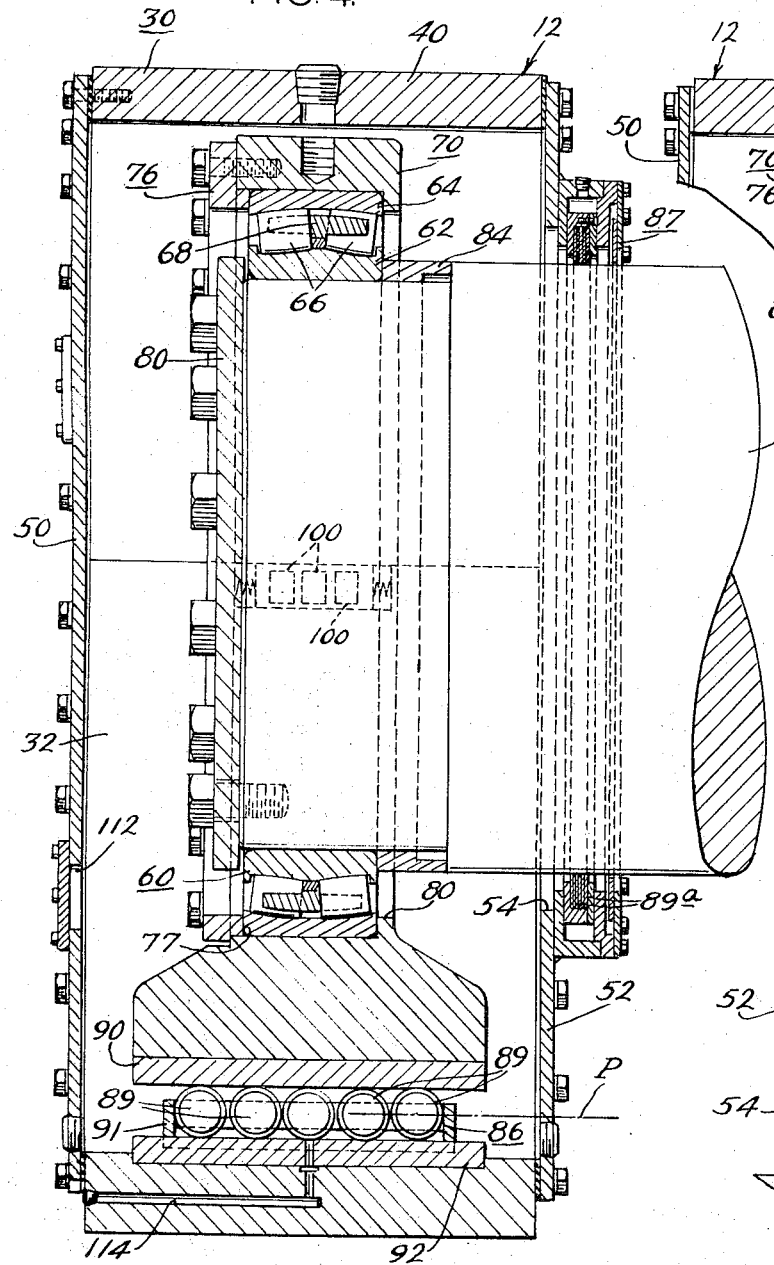
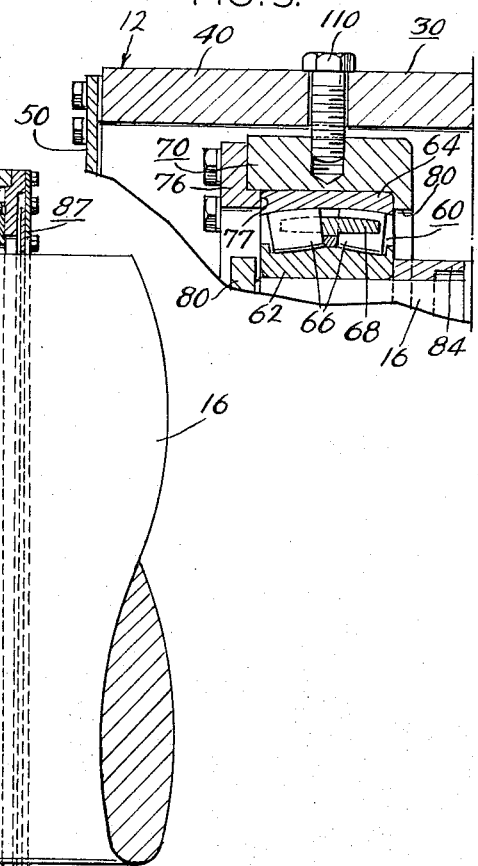
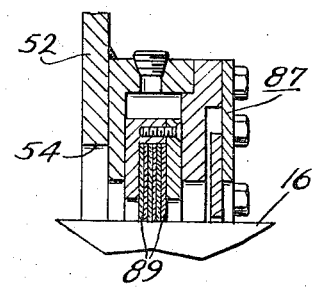
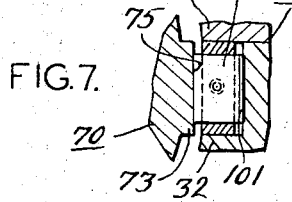
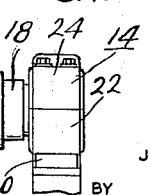
INVENTORS:
EDWARD V. BECKMAN
WALTER RALPH GOOD
JOSEPH HARRY SCHICKLING
ARCHIE YOUNG
BY Howson & Howson
ATTYS.

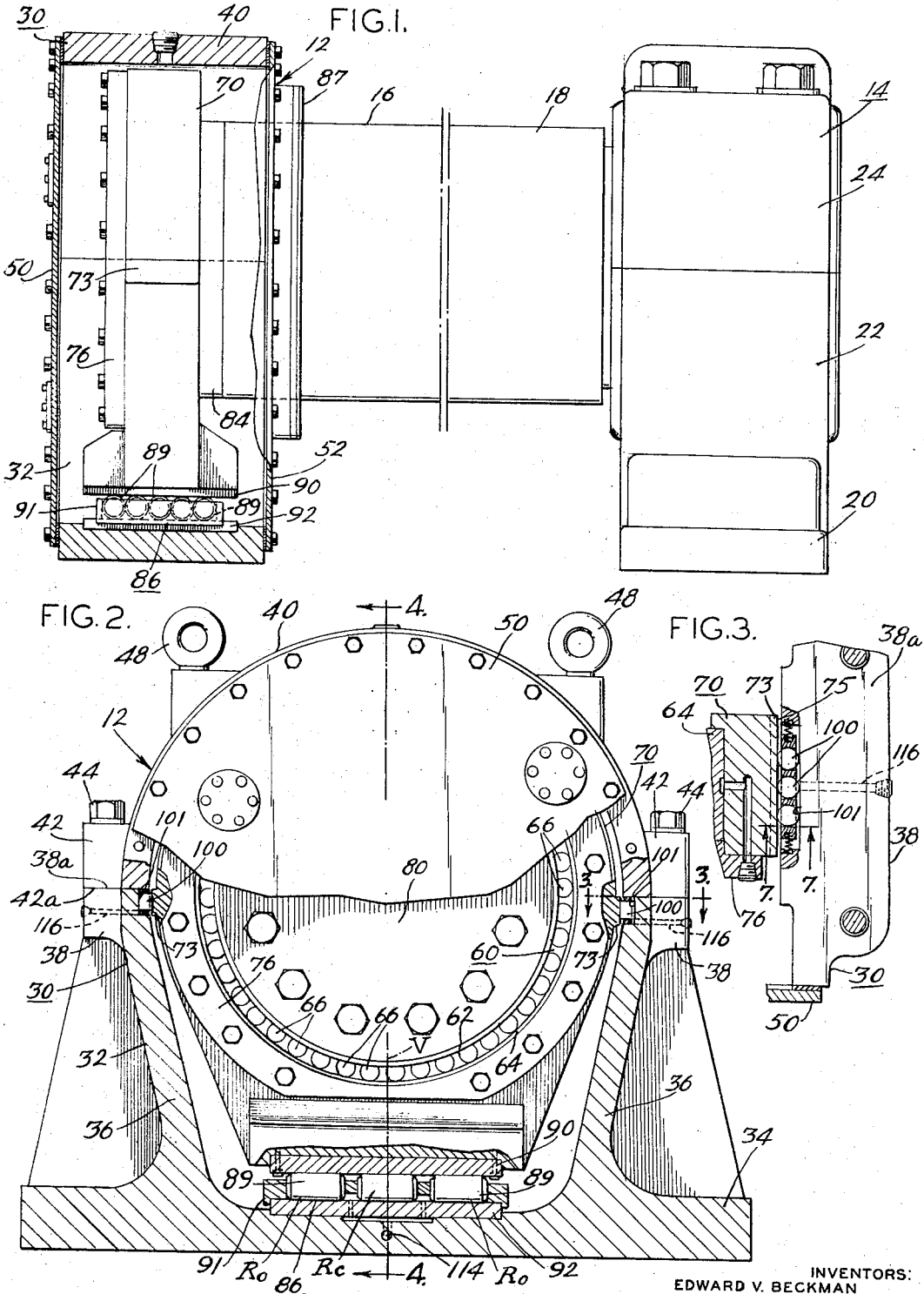

United States Patent Office 3,350,144
Patented Oct. 31, 1967

3,350,144
EXPANSION MOUNTING
Edward V. Beckman, Philadelphia, and Walter Ralph Good, Paoli, Pa., Joseph Harry Schickling, Hornell, N.Y., and Archie Young, Philadelphia, Pa., assignors to SKF Industries, Inc., King of Prussia, Pa., a corporation of Delaware
Filed Sept. 2, 1965, Ser. No. 484,565
2 Claims. (Cl. 308—6)

ABSTRACT OF THE DISCLOSURE

An expansion mounting assembly for supporting a rotatable member comprising a substantially enclosed main housing consisting of an upper and lower section, a cover plate detachably secured to one side of the open end of the main housing which carries a sealing element adapted to engage the rotatable member thereby providing an assembly wherein all of the internal parts are sealed from the surrounding atmosphere by a single seal. The expansion mounting further includes a housing cartridge, bearing means supporting the rotatable member in the housing cartridge, a ladder bearing supporting the housing cartridge for axial movement relative to the main housing and a plurality of roller elements mounted in pockets at diametrically opposed points between the main housing and the housing cartridge adapted to engage lateral projections on the housing cartridge thereby to absorb lateral shock loading. These elements also facilitate accurate positioning of the housing cartridge in the main housing upon initial assembly and also when it is desired and necessary to disassemble the housing cartridge from the main housing. Further, the pockets for the roller elements are located at the juncture of the top section and lower section of the main housing whereby the entire assembly is easier to assemble.

---

The present invention relates to expansion mountings and the like and more particularly to an improved expansion mounting which is of comparatively simple construction and which is extremely effective for the purposes intended.

Expansion mountings in accordance with the present invention have particular application in installations for supporting large rotatably mounted members. For example, the expansion mounting of the present invention may be used in conjunction with a conventional pillow block to rotatably support therebetween an oxygen convertor as shown schematically in FIG. 1. Because of the size of the equipment, the distance between the bearing supporting the convertor is relatively large, and since in these installations, the temperature can vary greatly, it is not unusual to get as much as 2½ to 3 inches axial movement at the expansion bearing on large convertors.

The expansion mounting of the present invention has features for providing optimum support for these installations in a manner to compensate for these comparatively large axial movements. To this end, in accordance with the present invention, the expansion mounting assembly includes a radial bearing assembly on which the trunnion is supported, the bearing assembly in turn being mounted in a housing cartridge which in turn is supported on a ladder bearing at the bottom of a main housing enclosing the entire trunnion, bearing and cartridge housing assembly. The rollers of the ladder bearing are mounted for rolling movement in an axial plane normal to a plane through the perpendicular center line of the housing and through the trunnion. By this arrangement, all linear motion is pure rolling and any thrust loading from the held end bearing is practically eliminated, thus allowing the use of light series spherical roller bearings on the trunnion. The ladder bearing rollers are preferably crowned to accommodate normal machining errors and deflection under maximum loading. A further feature of the present invention is that the main housing encloses the entire assembly so that the various bearings may be lubricated from a single source. Further, by this arrangement, in applications such as the converter where the general area is extremely dirty from dust and pieces of molten slag in metal, the entire expansion mounting assembly is protected. Additionally, only a single seal is needed to seal the entire expansion side housing.

A further feature of the present invention is the provision of a horizontal guide bearing assembly between the cartridge housing and the sides of the main housing which serve to accurately position the housing cartridge on the lower ladder bearings in the main housing. The guide bearing motion is also pure rolling so that expansion thrust loading from the held end bearing is minimized and horizontal shock load which can occur during deskulling and loading operations are effectively withstood.

With the foregoing in mind, an object of the present invention is to provide an improved expansion mounting which is of extremly simple design, is easy to assemble and in general is fully effective in operation and use.

A further object of the present invention is to provide an expansion mounting to accommodate comparatively large axial movement of an assembly such as an oxygen converter and whtich includes a new and improved ladder bearing arrangement wherein the linear motion is pure rolling thereby substantially eliminatnig expansion thrust loading from the held end bearing.

Another object of the present invention is to provide a completely enclosed expansion mounting wherein bearing elements may be lubricated from a single source and which requires only a single shaft seal to effectively seal the entire expansion side housing and wherein the various elements of the expansion mounting are protected from dust and foreign matter.

These and other objects of the present invention and the details of the construction and operation of an expansion mounting in accordance with the present invention are hereinafter more fully set forth with reference to the accompanying drawings, wherein:

FIG. 1 is a schematic illustration of an oxygen convertor assembly including an expansion mounting constructed in accordance with the present invention;

FIG. 1a is a schematic illustration of an expansion mounting constructed in accordance with the present invention and a conventional pillow block or the like supporting therebetween a rotatable member such as an oxygen convertor;

FIG. 2 is an end view partly in section of an expansion mounting in accordance with the present invention with parts broken away to show the structural details thereof more clearly;

FIG. 3 is an enlarged fragmentary sectional view taken on line 3—3 of FIG. 2;

FIG. 4 is an enlarged transverse sectional view taken through the expansion mounting on line 4—4 of FIG. 2;

FIG. 5 is a fragmentary sectional view showing the means for locating the cartridge housing in the main housing;

FIG. 6 is an enlarged fragmentary view in section of the main seal of the expansion mounting; and FIG. 7 is a fragmentary sectional view taken on line 7—7 of FIG. 3.

Referring now to the drawings, and particularly to FIG. 1a thereof, there is shown a typical arrangement for supporting a rotatable member such as an oxygen convertor schematically represented by the numeral 10. The convertor 10 as illustrated is supported in an expansion mounting 12 constructed in accordance with the present invention and a conventional pillow block 14. The convertor assembly 10 includes trunnions 16 and 18 at opposite ends which are rotatably journalled in bearings in the expansion mounting 12 and pillow block 14 respectively. The pillow block 14 is of conventional construction and may include a base 20 and a lower bearing housing section 22 formed integrally with the base of an upper bearing housing section 24 secured to the lower housing section by means of suitable fastening means, for example, bolts.

While a specific application of an expansion mounting in accordance with the present invention is illustrated, it is, of course, to be understood that there are many other useful applications for the same.

Considering now the specific structural details and arrangement of the expansion mounting and with particular reference to FIGS. 2 and 4, the expansion mounting comprises substantially enclosed main housing 30 consisting of a lower section 32 having an elongated flat base 34 and a pair of spaced apart upwardly diverging wings 36 which terminate at their upper terminal ends in outwardly projecting lateral extensions 38. The main housing 30 further includes a top section 40 of generally semi-cylindrical shape which also has lateral projections 42 at its terminal ends with flat faces 42a that overlie and seat on flat faces 38a of the lateral extensions 38 of the lower section. As illustrated, the top section 40 is secured to the lower section 32 by fastening means such as screws 44. The top section 40 also includes a pair of hangers in the form of eye bolts 48 to facilitate moving the expansion mounting assembly which may be quite large and heavy. The back end of the main housing 30 is closed by a cover plate 50 detachably secured in place by a series of fastening means such as screws. The front end of the main housing also is closed by an annular member 52 detachably secured to the axial end of the main housing by means of screws and has a central opening 54 therein to receive the trunnion 16.

With reference now to FIG. 4, the trunnion 16 is supported in a conventional double-row spherical roller bearing assembly 60 mounted on the reduced terminal end portion of the trunnion, the bearing assembly 60 comprising the usual inner and outer rings 62 and 64, a plurality of rolling elements in the form of rollers 66 and the usual cage 68 for supporting the rollers in the annular space between the rings. The roller bearing assembly 60 is supported in a housing cartridge 70 which, in turn is mounted interiorly of the main housing 30. As best illustrated, the annular ring 76 has an inner circumferentially extending shoulder 77 which engages one axial end face of the outer ring 64 of the bearing assembly and the housing cartridge also has a radially inwardly projecting shoulder 80 confronting the opposite axial end face of the outer ring 64 to locate the bearing assembly. The inner ring 62 of the bearing assembly is mounted between a face plate 80 secured to the axial end of the trunnion 18 and a collar 84 mounted on the reduced portion of the trunnion.

The housing cartridge 70 is mounted for axial movement relative to the main housing to compensate for axial expansion or contraction of the convertor due, for example, to large temperature changes. In the present instance, this is accomplished by means of a ladder bearing assembly 86 between the lower section of the housing cartridge 70 and the base of the main housing. The ladder bearing assembly comprises a plurality of rollers 89 supported in three rows by means of a cage 91, a center row $R_c$ substantially aligned with the vertical axis of the assembly as shown in FIG. 2 and outer rows $R_o$ on either side of the center row. The rollers are supported between a pair of flat bearing plates, upper plate 90 carried by the lower section of the cartridge housing and a lower plate 92 mounted on the base of the main housing.

By this arrangement the rolling axes of the rollers of the ladder bearing assembly are disposed in a plane P transverse to the vertical axis V of the expansion mounting assembly and thus, are mounted for rolling movement in a truly axial direction. Accordingly, light series spherical roller bearings may be used on the trunnions.

In some instances, the expansion mounting is subjected to horizontal shock load, for example, during deskulling and loading operations of the oxygen convertor which tends to displace the housing cartridge laterally in the main housing 12. In the present instance, bearing means is provided for taking up this lateral shock load. To this end, as best illustrated in FIG. 2, there is provided a series of rollers 100 disposed in pockets 101 in opposite sides of the main housing and the housing cartridge 70 is provided with diametrically opposed lateral projections 73 having axially extending bearing surfaces 75 which engage the rollers 100 (see FIGS. 3 and 7). These guide rollers 100 serve to accurately position the housing cartridge on the ladder bearing in the main housing. The guide roller motion is also pure rolling so that the expansion thrust loading from the held end bearing or pillow block is minimized. The bearing means for taking lateral shock load may comprise pairs of engaging pads carried by the main housing and housing cartridge and made of a suitable bearing material.

Sealing means is provided adjacent the front of the expansion mounting which is adapted to engage the trunnion and effectively seal the interior of the main housing. The seal 87 as best illustrated in FIG. 4, comprise a laminated structure including a plurality of annular sealing members 89a, made for example of compressed asbestos having graphite surfaces suitably supported on the forward end of the annular front cover 52 of the expansion mounting.

Consider now the installation of a convertor assembly at a given site employing an expansion mounting in accordance with the present invention. The parts of the expansion mounting of the present invention may be assembled completely prior to delivery to a site. Thus, the complete assembly as shown in FIG. 4 may be put together and in order to maintain the parts against relative movement, a locking screw 110 may be inserted through the main housing 30 which engages the housing cartridge 70 as shown in FIG. 5. Now when the expansion mounting is delivered to the installation site, the screw 110 is simply removed and in order to mount the convertor trunnion 16 in the expansion mounting, the rear cover plate 50 of the main housing is removed and the back plate 80 is also disassembled. The spacer 84 is then positioned over the reduced terminal end portion of the trunnion 16 and then the expansion mounting is fitted over the trunnion and is slipped into the bearing assembly 60. The back plate 80 is then bolted in place as shown in FIG. 4, and then the rear cover 50 of the main housing is also reassembled. The main housing is then filled to a given level with a suitable lubricant and to this end openings 112 are provided in the rear cover 50 of the main housing.

By this arrangement all of the parts of the expansion mounting may be lubricated from a single source, that is, the ladder bearing assembly and the spherical roller bearing assembly 60 and only the seal 87 required to protect the parts of the expansion mounting. This is especially important in applications such as an oxygen convertor installation where the surrounding atmosphere is extremely dirty because of dust and pieces of molten slag and metal which are blown into the atmosphere during each heat. If desired, individual lubrication ports may be provided to lubricate the various bearing elements such as the ladder bearing and the side expansion bearing assembles. For example, a lubrication channel 114 may be provided in the base of the main housing 30 to lubricate the ladder bearing and lubrication ports 116 communicating with the pocket for the rollers 100 may be provided in the wings of the main housing. A lubrication passageway (not shown) may also be provided in the housing cartridge which communicates with the bearing assembly 60.

While a particular embodiment of the present invention has been illustrated and described herein, it is not intended to limit the invention and changes and modifications may be made therein within the scope of the following claims.

We claim:

1. In an expansion mounting assembly for supporting a rotatable member, a substantially enclosed main housing consisting of a lower section having an elongated flat base and a pair of spaced apart upwardly diverging wings, a top section of generally semi-cylindrical shape secured to the lower section, a cover plate detachbly secured to one side of the open end of the main housing, and an annular wall secured to the opposite open end of the main housing defining an opening for receiving the rotatable member, a sealing element carried by said annular wall adapted to engage the rotatable member thereby providing an assembly wherein all of the internal parts including the bearing members are sealed from the surrounding atmosphere by a single seal, a housing cartridge mounted in the main housing, bearing means supporting the rotatable member in the housing cartridge, a ladder bearing assembly comprising a plurality of rollers disposed between the housing cartridge and the base of the main housing to permit axial movement of the housing cartridge relative to the main housing, the rolling axes of the rollers of the ladder bearing assembly disposed in a plane transverse to the vertical axis of the expansion mounting assembly and mounted for rolling movement in a truly axial direction, means defining slotted openings in the upper edge of each of the wings of the lower section of the main housing defining diametrically opposed pockets at the juncture of the top section and lower section of the main housing, diametrically opposed lateral projections having axially extending bearing surfaces on the housing cartridge, a plurality of roller elements in said pockets at diametrically opopsed points between the main housing and the housing cartridge at opposite sides of the main housing adapted to engage said lateral projections to absorb lateral shock loadings, the axes of said roller elements in said pockets extending parallel to a plane through the vertical axis of the expansion mounting assembly.

2. An expansion mounting assembly as claimed in claim 1 including a face plate secured to the axial end face of the rotatable member having a peripheral edge projecting beyond the rotatable member and confronting the inner ring of the double-row spherical roller bearing.

References Cited

UNITED STATES PATENTS

| | | | |
|---|---|---|---|
| 867,511 | 10/1907 | Karns | 308—176 |
| 1,243,049 | 10/1917 | Dewey | 308—176 X |
| 2,138,601 | 11/1938 | Herrmann | 308—207 X |
| 2,903,307 | 9/1959 | Peters et al. | 308—6 X |
| 2,976,090 | 3/1961 | McFeaters | 308—6 X |
| 3,003,827 | 10/1961 | Hentschke | 308—6 |
| 3,195,875 | 7/1965 | Mummert | 266—36 |
| 3,291,541 | 12/1966 | Dellinger | 308—6 |

MARTIN P. SCHWADRON, *Primary Examiner*.

ROBERT A. DUA, *Examiner*.